United States Patent
Lunden et al.

(10) Patent No.: US 12,028,730 B2
(45) Date of Patent: Jul. 2, 2024

(54) ARRANGEMENT OF MEASUREMENT REPORTING GROUPS

(71) Applicant: NOKIA SOLUTIONS AND NETWORKS OY, Espoo (FI)

(72) Inventors: Jari Petteri Lunden, Espoo (FI); Elena Virtej, Espoo (FI); Lars Dalsgaard, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 320 days.

(21) Appl. No.: 15/765,516

(22) PCT Filed: Oct. 5, 2015

(86) PCT No.: PCT/EP2015/072961
§ 371 (c)(1),
(2) Date: Apr. 3, 2018

(87) PCT Pub. No.: WO2017/059889
PCT Pub. Date: Apr. 13, 2017

(65) Prior Publication Data
US 2019/0075478 A1    Mar. 7, 2019

(51) Int. Cl.
*H04W 24/10* (2009.01)
*H04W 4/08* (2009.01)
*H04W 36/00* (2009.01)

(52) U.S. Cl.
CPC ............ *H04W 24/10* (2013.01); *H04W 4/08* (2013.01); *H04W 36/0094* (2013.01); *H04W 36/0069* (2018.08)

(58) Field of Classification Search
CPC ............ H04W 24/10; H04W 36/0069; H04W 36/0094; H04W 4/08
See application file for complete search history.

(56) References Cited

U.S. PATENT DOCUMENTS 9,999,052 B1 * 6/2018 Marupaduga ....... H04W 52/346
2013/0077508 A1 * 3/2013 Axmon ............. H04W 36/0094
370/252

(Continued)

FOREIGN PATENT DOCUMENTS

CN       102917392 A    2/2013
CN       104519539 A    4/2015

(Continued)

OTHER PUBLICATIONS

International Search Report & Written Opinion dated Jul. 27, 2016 corresponding to International Patent Application No. PCT/EP2015/072961.

(Continued)

Primary Examiner — Rebecca E Song
(74) Attorney, Agent, or Firm — Lippes Mathias LLP

(57) ABSTRACT

There is provided a method for a mobile communication system comprising receiving at a communication device cell configuration information from a network node, and the configuration information being related to cells in a network area comprising a first cell and one or more second cells. Further, the method further comprises receiving at the communication device environment information indicative of overlaps between coverage areas of the first cell and the one or more second cells, and causing transmission of measurement results obtained in the first cell for use in radio resource management of the communication device in the one or more second cells.

17 Claims, 6 Drawing Sheets

---

310 Receive cell configuration information for cells in an area of a radio access network and configure the cells.

↓ 320

Receive environment information indicative of overlaps between coverage areas of the configured cells

↓ 330

Configure a measurement reporting group comprising a reference cell and associated cells in the set of configured cells.

↓ 340

Transmit measurement reports obtained for the reference cell to the network for use in radio resource management for the cells in the group.

(56) References Cited

U.S. PATENT DOCUMENTS

| | | | | |
|---|---|---|---|---|
| 2014/0242982 | A1* | 8/2014 | Yang | H04W 36/0085 455/434 |
| 2015/0181373 | A1* | 6/2015 | Xie | H04W 64/00 455/406 |
| 2015/0181543 | A1* | 6/2015 | Hwang | H04W 56/001 370/336 |
| 2016/0006529 | A1* | 1/2016 | Yi | H04J 11/005 370/329 |
| 2016/0105857 | A1* | 4/2016 | Takeda | H04W 52/243 370/329 |
| 2016/0211892 | A1* | 7/2016 | Li | H04B 7/024 |
| 2016/0255528 | A1* | 9/2016 | Yao | H04W 24/10 370/252 |
| 2016/0338137 | A1* | 11/2016 | Mishra | H04W 36/08 |
| 2017/0006607 | A1* | 1/2017 | Etemad | H04W 72/0453 |
| 2017/0290015 | A1* | 10/2017 | Xu | H04W 72/0453 |
| 2018/0160392 | A1* | 6/2018 | Wan | H04W 8/26 |

FOREIGN PATENT DOCUMENTS

| | | | |
|---|---|---|---|
| EP | 2 373 084 A1 | 10/2011 | |
| EP | 2 925 081 A1 | 9/2015 | |
| WO | WO 2008/116120 A2 | 9/2008 | |
| WO | WO-2014017765 A1 * | 1/2014 | .......... H04W 56/001 |
| WO | WO-2016029864 A1 * | 3/2016 | ............ H04W 36/00 |

OTHER PUBLICATIONS

Ericsson: "Introducing RSSI measurements for LAA," 3GPP Draft; 36331_CRYYY_(REL-13)_R2-154642, 3GPP TSG-RAN WG2 Meeting #91bis, Malmo, Sweden, Oct. 5-9, 2015, XP051004937.
Nokia Networks: "Measurements for unlicensed band," 3GPP Draft; R2-151349, 3GPP TSG-RAN WG2 Meeting #89bis, Bratislava, Slovakia, Apr. 20-24, 2015, XP050936297.
May 31, 2018 Office Action issued in Vietnamese Patent Application No. 1-2018-01839.
Chinese Office Action issued in corresponding Chinese Patent Application No. 201580083600.1 dated Aug. 3, 2020.
European Office Action issued in corresponding European Patent Application No. 15 777 918.2-1212 dated Jun. 18, 2020.
Chinese Office Action issued in corresponding Chinese Patent Application No. 201580083600.1 dated Mar. 2, 2021.
Vietnamese Office Action issued in corresponding Vietnamese Patent Application No. 1-2018-01839 dated Mar. 25, 2022.
European Office Action issued in corresponding European Patent Application No. 15 777 918.2-1212 dated Dec. 10, 2021.

* cited by examiner

ARRANGEMENT OF MEASUREMENT REPORTING GROUPS

FIELD

The present invention relates to the field of wireless communications. More specifically, the present invention relates to methods, apparatus, systems and computer programs for radio access management in a wireless communication system.

BACKGROUND

A communication system can be seen as a facility that enables communication sessions between two or more entities such as user terminals, base stations and/or other nodes by providing radio carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a radio carrier provided by a station, for example a base station of a cell, and transmit and/or receive communications on the radio carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. Certain releases of 3GPP LTE (e.g., LTE Rel-11, LTE Rel-12, LTE Rel-13) are targeted towards LTE-Advanced (LTE-A). LTE-A is directed towards extending and optimizing the 3GPP LTE radio access technologies.

Communication systems may be configured to use a mechanism for aggregating radio carriers to support wider transmission bandwidth. In LTE this mechanism is referred to as carrier aggregation (CA) and can, according to current specifications, support a transmission bandwidth up to 100 MHz. A communication device with reception and/or transmission capabilities for CA can simultaneously receive and/or transmit on multiple component carriers (CCs) corresponding to multiple serving cells, for which the communication device has acquired/monitors system information needed for initiating connection establishment. When CA is configured, the communication device has only one radio resource control (RRC) connection with the network. At RRC connection establishment/reestablishment or handover, one serving cell provides the non-access stratum (NAS) mobility information, such as tracking area identity information. At RRC connection (re)establishment or handover, one serving cell provides the security input. This cell is referred to as the primary serving cell (PCell), and other cells are referred to as the secondary serving cells (SCells). Depending on capabilities of the communication device, SCells can be configured to form together with the PCell a set of serving cells under CA. In the downlink, the carrier corresponding to the PCell is the downlink primary component carrier (DL PCC), while in the uplink it is the uplink primary component carrier (UL PCC). A SCell needs to be configured by the network using RRC signaling before usage in order to provide necessary information, such as DL radio carrier frequency and physical cell identity (PCI) information, to the communication device. A SCell for which such necessary information has been provided to a communication device is referred to as configured cell for this communication device. The information available at the communication device after cell configuration is in particular sufficient carrying out cell measurements. A configured SCell is in a deactivated state after cell configuration for energy saving. When a SCell is deactivated, the communication device does in particular not monitor/receive the physical dedicated control channel (PDCCH) or physical downlink shared channel (PDSCH) in the SCell. In other words the communication device cannot communicate in a SCell after cell configuration, and the SCell needs to be activated before data transmission from/the communication device can be initiated in the SCell. LTE provides for a mechanism for activation and deactivation of SCells via media access control (MAC) control elements to the communication device.

A communication system may be configured to support simultaneous communication with two or more access nodes. In LTE this mechanism is referred to as dual connectivity (DC). More specifically, a communication device may be configured in LTE to communicate with a master eNB (MeNB) and a secondary eNB (SeNB). The MeNB may typically provide access to a macrocell, while the SeNB may provide on a different radio carrier access to a relatively small cell, such as a picocell. Only the MeNB maintains for the communication device in DC mode a connection via an S1-MME interface with the mobility management entity (MME), that is only the MeNB is involved in mobility management procedures related to the communication device in DC mode. So far, LTE supports two different user plane architectures for communication devices in DC mode. In the first architecture (split bearer) only the MeNB is connected via an S1-U interface to the serving gateway (S-GW) and the user plane data is transferred from the MeNB to the SeNB via an X2 interface. In the second architecture the SeNB is directly connected to the S-GW, and the MeNB is not involved in the transport of user plane data to the SeNB. DC in LTE reuses for the radio interface concepts introduced for CA in LTE. A first group of cells, referred to as master cell group (MCG), can be provided for a communication device by the MeNB and may comprise one PCell and one or more SCells, and a second group of cells, referred to as secondary cell group (SCG), is provided by the SeNB and may comprise a primary SCell (PSCell) with functionality similar to the PCell in the MCG, for example with regard to uplink control signaling from the communication device. This second group of cells may further comprise one or more SCells.

Aggregation of radio carriers for communication to/from a communication device and simultaneous communication with two or more access nodes may in particular be used for operating cells on unlicensed spectrum. Wireless communication systems may be licensed to operate in particular spectrum bands. A technology, for example LTE, may operate, in addition to a licensed band, in an unlicensed band. LTE operation in the unlicensed spectrum may be based on the LTE Carrier Aggregation (CA) framework where one or more low power secondary cells (SCells) operate in the unlicensed spectrum and may be either downlink-only or contain both uplink (UL) and downlink (DL), and where the primary cell (PCell) operates in the licensed spectrum and can be either LTE Frequency Division Duplex (FDD) or LTE Time Division Duplex (TDD). One proposal for operating LTE in unlicensed spectrum is Licensed-Assisted Access (LTE-LAA). Technologies like LTE-LAA may need to abide by certain rules, for example a clear channel assessment procedure, such as Listen-Before-Talk (LBT), in order to provide fair coexistence between LTE and other technologies such as Wi-Fi as well as between LTE operators. In some jurisdictions respective rules may be specified in regulations.

Deployment of small cells on licensed and unlicensed spectrum is a mechanism to enhance system capacity within the coverage area of a radio access network in a communication system. Small cells, such as picocells, may be deployed progressively in future radio access network to match the growth in demand for system capacity as the population of communication devices and data applications become more and more demanding. Small cells may typically be deployed in areas of high traffic requirements. This means that small cells may be deployed non-homogeneously resulting in non-uniformly distributed small cells. The overlap of coverage areas between some of the small cells may therefore be large in such non-homogeneous deployment.

The following relates to the deployment of small cells, such as picocells, in licensed or unlicensed spectrum. Specifically, it relates to measurements for radio resource management of a communication device in small cells of a heterogeneous radio access network. Small cells could be referred to as any low(er) power class access points than a macro cell. 3GPP now works towards the future LTE and 5G in which there is a common understanding that the future networks will include massive need of support from and deployment of small cells in order to manage the traffic needs from the users (and new use cases).

In future networks, such as 5G, the different layers/cells used by the network towards a single communication device may be from more than a single radio technology, for example a 5G capable communication device may be able to operate simultaneously on more than one radio access technology, such as LTE and 5G. In such advanced networks carrier aggregation and dual connectivity may not be limited to the use of radio carriers according to only one radio access technology. Rather, aggregation of radio carriers according to different radio access technologies and concurrent communication on such aggregated carriers may be supported.

An increasing deployment of small cells in radio access network brings about that a communication device may detect more and more cells in its vicinity which are candidates for connection establishment. Enhancements of carrier aggregation (CA) mechanisms may be needed to make best use of the additional small cells in future radio access networks. One such enhancement may be to allow for an aggregation of more cells, for example up to 32 as currently discussed for LTE. An issue which needs to be addressed for supporting aggregation of 32 carriers is to provide signaling mechanisms for radio resource management (RRM) in a respective communication system, in particular for cell activation/deactivation at a communication device. It is in particular an issue to provide RRM entities in the network in an efficient way with sufficient information about the cells in the vicinity of a communication device so as to ensure that the network offloads data traffic of the communication device to small cells when possible and needed.

RRM of SCells for a communication device by the network may be based on or assisted by measurement reporting from the communication device. According to current specifications (see 3GPP technical specification TS 36.133) a communication device shall be capable of performing reference signal received power (RSRP) measurements and reference signal received quality (RSRQ) measurements for up to eight identified cells on a component carrier of a SCell. Simply expanding the current measurement requirements/specifications devised for a system supporting up to five component carriers (CC) to a communication system supporting aggregation of up to 32 CC would bring about a significant measurement burden for the communication device. However, such an extensive measurement reporting may only be needed for a communication device being configured with CCs in the range of the allowed maximum. Further, the value or significance the network may ascribe to measurement reports from various SCells may depend on the current traffic requirements in an area of the network and the strategy for traffic steering currently applied in this area.

Therefore, there is a need to provide a flexible measurement reporting scheme for enabling efficient radio resource management in future heterogeneous networks supporting large-scale carrier aggregation at communication devices.

SUMMARY

In a first aspect, there is provided a method comprising receiving at a communication device in a cellular mobile network configuration information related to cells in an area of the network comprising first configuration information for a first cell and one or more second cells, wherein the first configuration information comprises an indication of the downlink radio carrier frequency of the first cell and the downlink radio carrier frequencies of each of the one or more second cells, receiving environment information indicative of overlaps between coverage areas of the first cell and the one or more second cells, and causing transmission of measurement results obtained in the first cell for use in radio resource management of the communication device in the one or more second cells.

The configuration of the first cell and the one or more second cells may require the presence of a third cell for providing the communication device with at least one of: non-access stratum mobility information, and security input at radio resource control connection establishment or resource control connection reestablishment or handover.

The environment information may at least be indicative of location information of one or more transmission points of the first cell, and location information of one or more transmission points of each of the one or more second cells, The location information for at least one transmission point of the first cell may be identical with the location information of at least one of the transmission points of each of the one or more second cells.

The environment information may be indicative of overlaps between coverage areas of the first cell and the one or more second cells and may comprise an indication of association between the first cell and the one or more second cells.

The indication of association may comprise information on an arrangement of the first cell and the one or more second cells in a measurement reporting group.

The information on the arrangement may comprise selection information for use of the first cell as a reference cell in the measurement reporting group, wherein measurement reporting is only performed for the reference cell in the measurement reporting group.

The coverage areas of the first cell and the one or more second cells may be of about the same size and the coverage area of the first cell may overlap with the coverage areas of each of the one or more second cells.

The downlink radio carrier frequency of the first cell and the downlink radio carrier frequencies of each of the one or more second cells may be in a frequency band of a predetermined bandwidth.

The communication device may be configured to communicate in a forth cell, wherein the downlink radio carrier frequency of the forth cell may be in a frequency range which allows for measurement of signals in the first cell without causing measurement gaps in the communication between the communication device and the access node of the forth cell.

The forth cell may be identical with the third cell.

The first cell may be activated for the communication device for monitoring a downlink control channel carrying scheduling and/or resource allocation information in the first cell and the one or more second cells may not be activated for the communication device for monitoring a downlink control channel carrying scheduling and/or resource allocation information in any of the one or more second cells.

The method may further comprise activating one of the one or more second cells for the communication device for monitoring a downlink control channel carrying scheduling and/or resource allocation information in the one of the one or more second cells, and causing transmission of measurement results obtained in the one of the one or more second cells for use in radio resource management of the communication device in the one of the one or more second cells.

The method may further comprise deactivating the one of the one or more second cells for the communication device for monitoring a downlink control channel carrying scheduling and/or resource allocation information in the one of the one or more second cells, and causing transmission of measurement results obtained in the one of the one or more second cells for use in radio resource management of the communication device in the one of the one or more second cells.

The method may further comprise receiving a measurement control message related to measurements of the one of the one or more second cells comprising a suspend indication, and suspending transmission of measurement results obtained in the one of the one or more second cells for use in radio resource management of the communication device in the one of the one or more second cells based on the suspend indication.

The method may further comprise causing transmission of validity information indicative of a degree of validity of the received environment information indicative of overlaps between coverage areas of the first cell and the one or more second cells The first cell and the one or more second cells may be secondary cells in an evolved universal terrestrial radio access network.

The third cell may be a primary cell in an evolved universal terrestrial radio access network.

The downlink control channel may be a physical downlink control channel or an enhanced physical downlink control channel in an evolved universal terrestrial radio access network.

The method may further comprise receiving second configuration information for at least one of the first cell and the one or more second cells, wherein the second configuration information may comprise an indication of the downlink radio carrier frequency of the at least one of the first cell and the one or more second cells, selecting the first configuration information or the second configuration information for the at least one of the first cell and the one or more second cells, and using the selected configuration information in a method according to the first aspect.

In a second aspect, there is provided a method comprising causing transmission of configuration information related to cells in an area of a cellular mobile network comprising first configuration information for a first cell and one or more second cells, wherein the first configuration information comprises an indication of the downlink radio carrier frequency of the first cell and the downlink radio carrier frequencies of each of the one or more second cells, causing transmission of environment information indicative of overlaps between coverage areas of the first cell and the one or more second cells, receiving measurement results obtained in the first cell, and using the measurement results in radio resource management of a communication device in the one or more second cells.

The configuration of the first cell and the one or more second cells may require the presence of a third cell for providing the communication device with at least one of: non-access stratum mobility information, and security input at radio resource control connection establishment or resource control connection reestablishment or handover.

The environment information may at least be indicative of: location information of one or more transmission points of the first cell, and location information of one or more transmission points of each of the one or more second cells, The location information for at least one transmission point of the first cell may be identical with the location information of at least one of the transmission points of each of the one or more second cells.

The environment information may be indicative of overlaps between coverage areas of the first cell and the one or more second cells and may comprise an indication of association between the first cell and the one or more second cells.

The indication of association may comprise information on an arrangement of the first cell and the one or more second cells in a measurement reporting group.

The information on the arrangement may comprise selection information for use of the first cell as a reference cell in the measurement reporting group, wherein measurement reporting may only be performed for the reference cell in the measurement reporting group.

The coverage areas of the first cell and the one or more second cells may be of about the same size and the coverage area of the first cell may overlap with the coverage areas of each of the one or more second cells.

The downlink radio carrier frequency of the first cell and the downlink radio carrier frequencies of each of the one or more second cells may be in a frequency band of a predetermined bandwidth.

The communication device may be configured to communicate in a forth cell, wherein the downlink radio carrier frequency of the forth cell may be in a frequency range which may allow for measurement of signals in the first cell without causing measurement gaps in the communication between the communication device and the access node of the forth cell.

The forth cell may be identical with the third cell.

The first cell may be activated for the communication device for monitoring a downlink control channel carrying scheduling and/or resource allocation information in the first cell and the one or more second cells may not be activated for the communication device for monitoring a downlink control channel carrying scheduling and/or resource allocation information in any of the one or more second cells.

The method may further comprise causing activation of one of the one or more second cells for the communication device for monitoring a downlink control channel carrying scheduling and/or resource allocation information in the one of the one or more second cells, receiving measurement results obtained in the one of the one or more second cells, and using the measurement results obtained in the one of the one or more second cells in radio resource management of the communication device in the one of the one or more second cells.

The method may further comprise causing deactivation of the one of the one or more second cells for the communication device for monitoring a downlink control channel carrying scheduling and/or resource allocation information in the one of the one or more second cells, receiving measurement results obtained in the one of the one or more second cells, and using the measurement results obtained in the one of the one or more second cells in radio resource management of the communication device in the one of the one or more second cells.

The method may further comprise causing transmission of a measurement control message related to measurements of the one of the one or more second cells comprising a suspend indication, and suspending using of measurement results obtained in the one of the one or more second cells in radio resource management of the communication device in the one of the one or more second cells.

The method may further comprise receiving validity information indicative of a degree of validity of the transmitted environment information indicative of overlaps between coverage areas of the first cell and the one or more second cells.

The first cell and the one or more second cells may be secondary cells in an evolved universal terrestrial radio access network.

The third cell may be a primary cell in an evolved universal terrestrial radio access network.

The downlink control channel may be a physical downlink control channel or an enhanced physical downlink control channel in an evolved universal terrestrial radio access network.

The method may further comprise causing transmission of second configuration information for at least one of the first cell and the one or more second cells, wherein the second configuration information may comprise an indication of the downlink radio carrier frequency of the at least one of the first cell and the one or more second cells, selecting the first configuration information or the second configuration information for the at least one of the first cell and the one or more second cells, and using the selected configuration information in a method according to the second aspect.

In a third aspect, there is provided an apparatus, said apparatus comprising at least one processor; and at least one memory including computer program code, the at least one memory and the computer program code configured, with the at least one processor, to cause the apparatus at least to receive at a communication device in a cellular mobile network configuration information related to cells in an area of the network comprising first configuration information for a first cell and one or more second cells, wherein the first configuration information comprises an indication of the downlink radio carrier frequency of the first cell and the downlink radio carrier frequencies of each of the one or more second cells, receive environment information indicative of overlaps between coverage areas of the first cell and the one or more second cells, and cause transmission of measurement results obtained in the first cell for use in radio resource management of the communication device in the one or more second cells.

In a forth aspect, there is provided an apparatus, said apparatus comprising at least one processor; and at least one memory including computer program code, the at least one memory and the computer program code configured, with the at least one processor, to cause the apparatus to perform at least to cause transmission of configuration information related to cells in an area of a cellular mobile network comprising first configuration information for a first cell and one or more second cells, wherein the first configuration information comprises an indication of the downlink radio carrier frequency of the first cell and the downlink radio carrier frequencies of each of the one or more second cells, cause transmission of environment information indicative of overlaps between coverage areas of the first cell and the one or more second cells, receive measurement results obtained in the first cell, and use the measurement results in radio resource management of a communication device in the one or more second cells.

In a fifth aspect, there is provided a computer program embodied on a non-transitory computer-readable storage medium, the computer program comprising program code for controlling a process to execute a process, the process comprising receiving at a communication device in a cellular mobile network configuration information related to cells in an area of the network comprising first configuration information for a first cell and one or more second cells, wherein the first configuration information comprises an indication of the downlink radio carrier frequency of the first cell and the downlink radio carrier frequencies of each of the one or more second cells, receiving environment information indicative of overlaps between coverage areas of the first cell and the one or more second cells, and causing transmission of measurement results obtained in the first cell for use in radio resource management of the communication device in the one or more second cells.

In a sixth aspect, there is provided a computer program embodied on a non-transitory computer-readable storage medium, the computer program comprising program code for controlling a process to execute a process, the process comprising causing transmission of configuration information related to cells in an area of a cellular mobile network comprising first configuration information for a first cell and one or more second cells, wherein the first configuration information comprises an indication of the downlink radio carrier frequency of the first cell and the downlink radio carrier frequencies of each of the one or more second cells, causing transmission of environment information indicative of overlaps between coverage areas of the first cell and the one or more second cells, receiving measurement results obtained in the first cell, and using the measurement results in radio resource management of a communication device in the one or more second cells.

In a seventh aspect, there is provided an apparatus comprising means for performing any method according to the first aspect.

In an eighth aspect, there is provided an apparatus comprising means for performing any method according to the second aspect.

In a ninth aspect there is provided a computer program product for a computer, comprising software code portions for performing the steps of any method according to the first or the second aspect when said product is run on the computer.

In a tenth aspect there is provided a communication system comprising at least one apparatus according to the third aspect and at least one apparatus according to the forth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
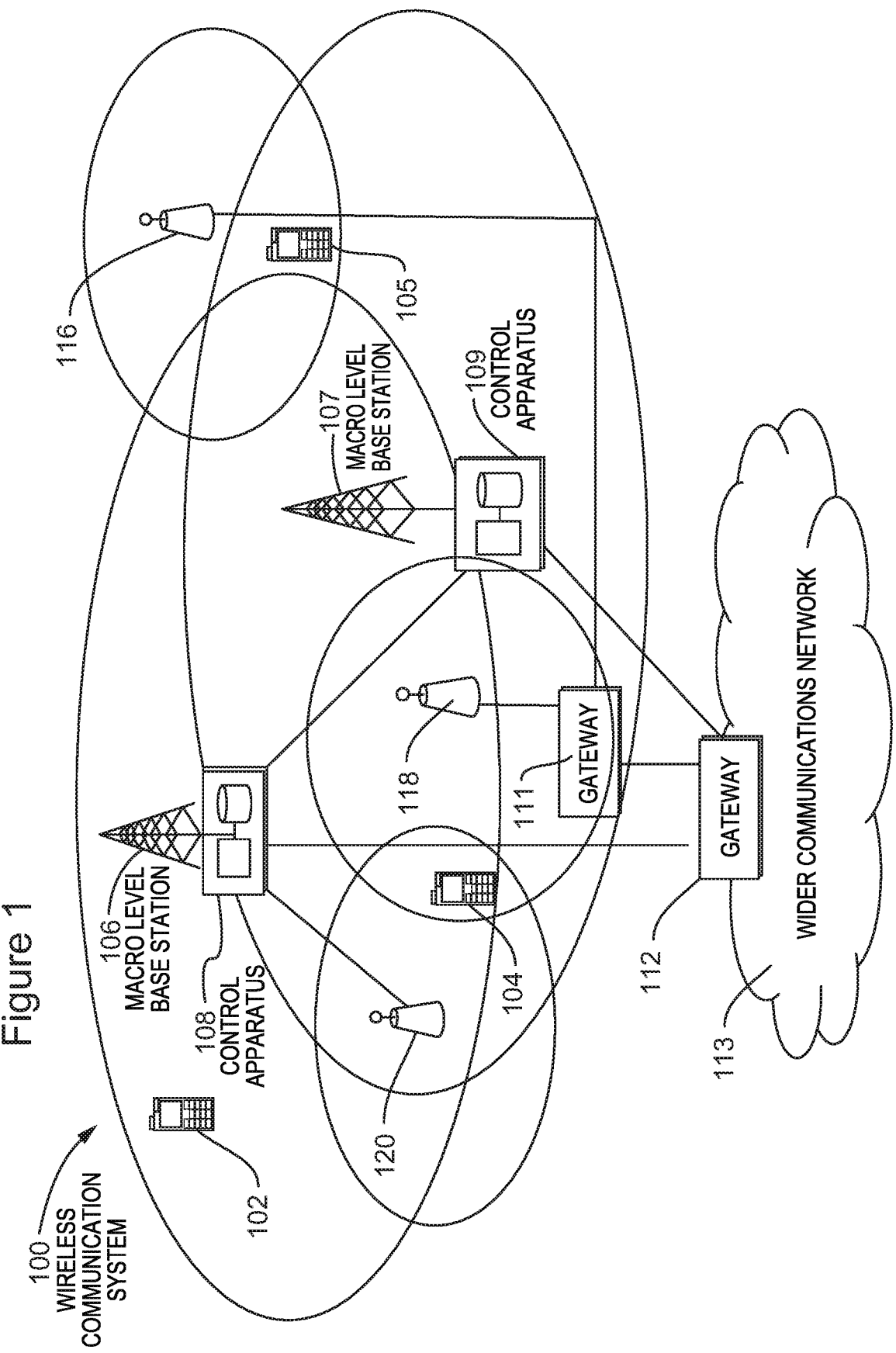
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
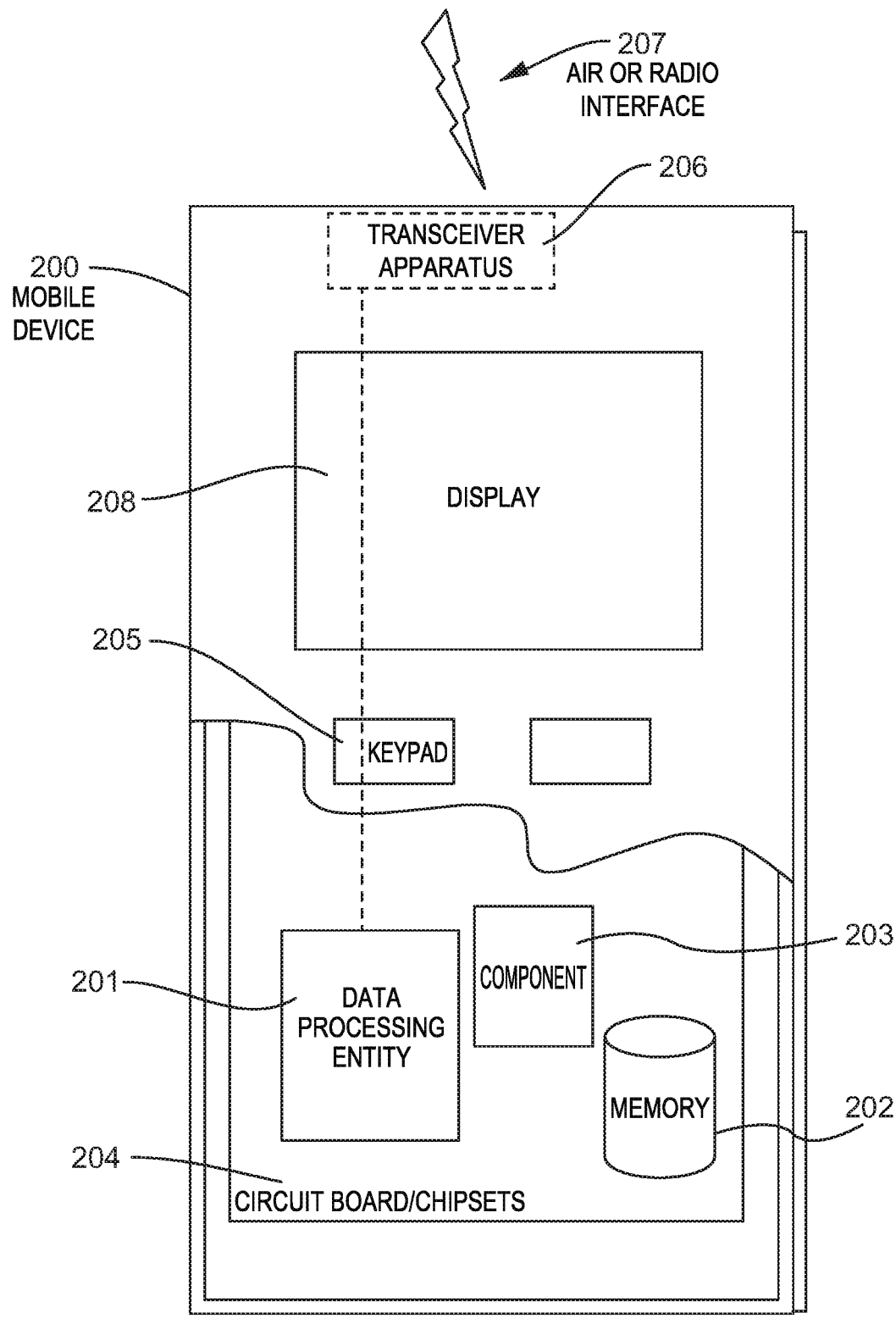
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on. Signaling mechanisms and procedures, which may enable a device to address in-device coexistence (IDC) issues caused by multiple transceivers, may be provided with help from the LTE network. The multiple transceivers may be configured for providing radio access to different radio technologies.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

As discussed above, there is a need to provide a flexible measurement reporting scheme for enabling efficient radio resource management in future heterogeneous networks supporting large-scale carrier aggregation at communication devices.

The scheme according to embodiments of this invention exploits correlations between measurement results which will typically exist for small cells with a large overlap of coverage areas. Available information in the network on these correlations is used to arrange configured cells in a network area in measurement reporting groups. The groups are arranged such that measurement results related to cells in each group are strongly correlated. Due to this strong correlation it may be sufficient for a communication device to perform measurement reporting for (preferably) only one cell in each group. This cell is in the following referred to as reference cell for distinguishing it from other cells in the group, in the following referred to as associated cells.

The arrangement of measurement reporting groups for a communication device may depend on the network's strategy for traffic steering in the network area. This strategy may include steering of data traffic to/from the communication device, for example based on the requested services of the device, into particular frequency bands. Therefore it may be advantageous to select reference cells preferably in these bands for providing the radio resource management entities good insight into the radio conditions in these particular frequency bands. Associated cells in other frequency bands may be arranged around the selected reference cells.

The arrangement of measurement reporting groups for a communication device may depend on whether the communication device is moving or not. In case of a rather static device with high data requirements it may be advantageous to configure reference cells with a large overlap across a plurality of frequency bands so as to provide the radio resource management entities rather exhaustive insight into radio conditions around the communication device. In case of a rather fast moving device it may be necessary to select reference cells with a lesser overlap to ensure that suitable cells are reported early, so as to initiate their timely activation along the route of the communication device if needed.

The arrangement of measurement reporting groups for a communication device may depend on its data traffic requirements. In case of rather low requirements it may be sufficient to configure only few reference cells and correspondingly bigger measurement reporting groups.

The arrangement of measurement reporting groups, and in particular the selection of reference cells, may depend on characteristics of the radio part in the communication device, so as to avoid measurement gaps in activated cells and/or high power consumption in the radio part.

The arrangement of measurement reporting groups may depend on whether a frequency band is on licensed or unlicensed spectrum. Communication in an unlicensed band may be less stable due to uncoordinated access from other operators or other radio access technologies. Cell activation/deactivation may therefore more likely occur in unlicensed bands than in licensed bands, and it may be advantageous to configure reference cells preferably in unlicensed bands, so as to provide radio resource management entities sufficient insight for fast and efficient cell activation/deactivation in unlicensed spectrum.

The arrangement of measurement reporting groups in a network area for a communication device may be carried out under control of a network entity. Respective information may be available in the network, for example, from deployment information in the network area and/or measurement reports from other communication devices related to the network area.

The communication device may assist the network entity by providing internal information, for example measurement results or location information.

In an alternative embodiment, the arrangement of measurement reporting groups for a communication device may be carried out under control of the communication device based information provided by a network entity. This information may comprise information indicative of coverage areas of cells in the network area, overlaps between the cells' coverage areas and information indicative of detected, estimated/predicted correlations between measurement results in the cells. The network entity may further provide control parameters, such as preference information with regard to the selection of the reference cells or the size of the groups.

In a further embodiment, the arrangement of measurement reporting groups may be negotiated between the communication device and a network entity. The communication device may in particular provide validity information on the arrangement based on tentative measurements on associated cells of the measurement reporting group.

The arrangement of measurement groups may be carried out such that cells in a group are of about the same size. The ratios of the cell diameters in a group may be within a certain range, for example within about 2/3 to 3/2 (corresponding to ratios of coverage areas in the range of about 0.5 to 2 irrespective of the exact shapes) in relation to the average diameter in the group or in relation to the diameter of the reference cell.

The arrangement of measurement groups may be carried out such that cells in a group are of about the same size. The cells (e.g. PCell and/or SCell) may be grouped and/or there may be more than one grouping. The group of cells (e.g. small cells) may be deployed on different frequency layers/bands or on the same frequency layers/bands. In an example embodiment, based on the SCell location information the communication device may assume SCell radio conditions (co-location) and them being detectable and accessible.

Deployment information for a network area may in particular comprise information related to co-located access points and/or transmission points connected to access points in the network area. Two access points and/or transmission points may be deemed co-located if the distance between the two points is small in relation to the size of their cells and/or to the average cell size in the considered network area. For example, the distance between two access points and/or transmission points may be less than 20 percent of the cell diameter according to a respective cell size measure.

Figure 3:
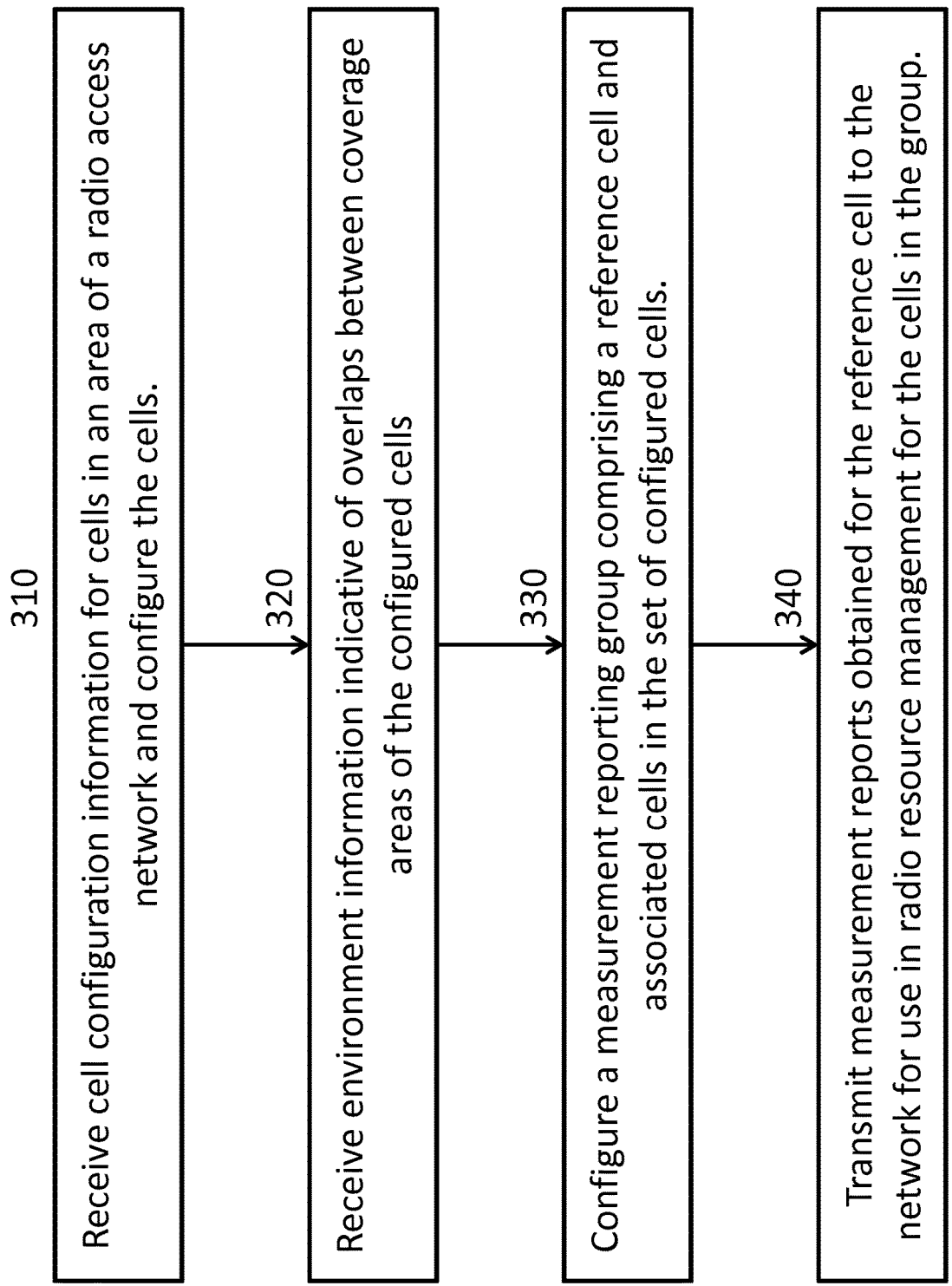
FIG. 3 shows an example method of a mobile communication device for assisting radio resource management in a network.

FIG. 3 shows a flow diagram of a method for measurement reporting carried out by a communication device according to some embodiments.

At step 310, the communication device receives cell configuration information for a set of cells in an area of a radio access network. The communication device configures the cells and can carry out measurements of DL signals in these cells. The method proceeds to step 320, which may be carried out before, after or in combination with step 310.

At step 320, the communication device receives environment information indicative of overlaps between the coverage areas of at least some of the configured cells in said area. The method proceeds to step 330.

At step 330, the communication device configures measurement reporting groups. Each measurement reporting group comprises a reference cell and one or more associated cells.

The arrangement of measurement reporting groups reflects the received environment information, in that measurements of DL signals in cells of a group are correlated. The method proceeds to step 340.

At step 340, the communication device performs measurement reporting for the reference cell. The network uses the measurement reports in radio resource management procedures, such as cell activation/deactivation of associated cells.

Figure 4:
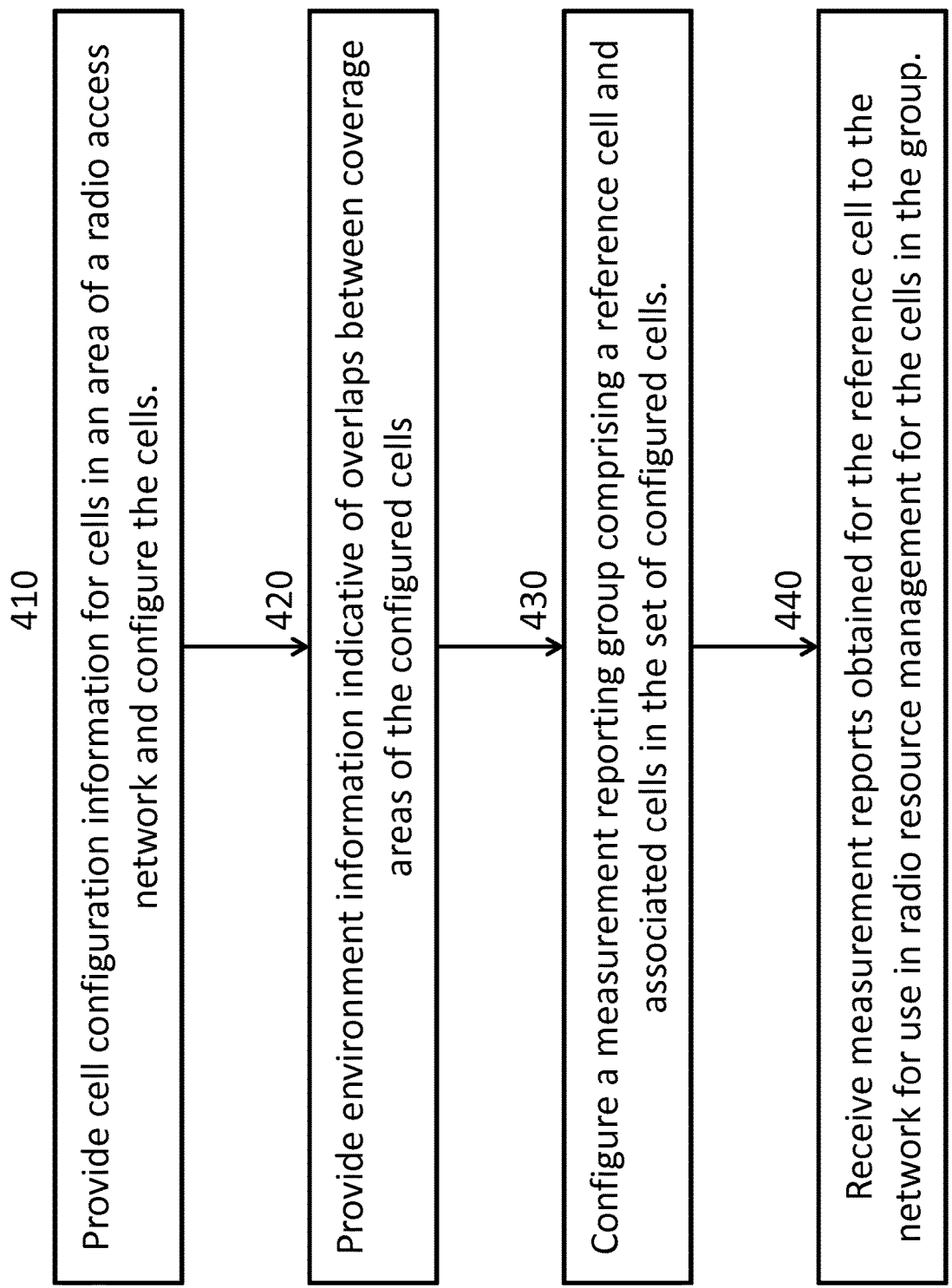
FIG. 4 shows an example method of a network node for measurement assisted radio resource management in a network.

FIG. 4 shows a flow diagram of a method for measurement reporting carried out by a network node according to some embodiments.

At step 410, the network node, for example an access node, provides cell configuration information for a set of cells in an area of a radio access network area to a communication device. The method proceeds to step 420, which may be carried out before, after or in combination with step 410.

At step 420, the network node provides environment information indicative of overlaps between the coverage areas of at least some cells in said area to the communication device. The method proceeds to step 430.

At step 430, the network node configures measurement reporting groups. Each measurement reporting group comprises a reference cell and one or more associated cells.

The arrangement of measurement reporting groups reflects the provided environment information, in that measurements of DL signals in cells of a group are correlated. The method proceeds to step 440.

At step 440, the network node receives measurement reports for the reference cell. The network uses the measurement reports in radio resource management procedures, such as cell activation/deactivation of associated cells.

It should be understood that the information indicative of overlaps between coverage areas at steps 320 and 420 need not comprise explicit information on overlaps between cells in a certain network area. Rather, this information is to be construed as any information related to a measure of correlation between expected or observed measurement results in considered cells. This information may in elementary embodiments merely indicate whether or not the correlation between considered cells exceeds a certain threshold, that is, whether or not there is an overlap between the considered cells. This information may in particular be conveyed by means of the selected arrangement of measurement reporting groups, since the assignment of an associated cell to a group of a reference cell indicates that the correlation between measurement results of the reference cell and measurement results of the associated cell exceeds a certain threshold. In other words the assignment of an associated cell to the group of a reference cell is indicative of an overlap between the coverage areas of the reference cell and the associated cell.

In an embodiment the information indicative of overlaps between coverage areas at steps 320 and 420 may be based on co-location information available in the network. The network may configure the communication device with multiple cells, such a SCells in LTE, based on any implicit or explicit co-location indication, and the cell location information may then be used by the communication device for reducing measurement efforts/requirements.

In an embodiment the communication device receives instructions from the network whether or not it is to perform measurement reporting of signals in a cell/radio carrier. These instructions may be used to configure reference cells in measurement reporting groups. Alternatively or additionally, these instructions may be used to configure measurement reporting for associated cells, for example for monitoring/verifying the validity of an arranged measurement reporting group. These instructions may be conveyed through measurement configurations from the network through certain information elements, such as the MeasObjectEUTRA IE in an evolved universal terrestrial radio access network (EUTRAN). Alternatively, these instructions may be conveyed through measurement cycle information, such as the MeasCycleSCell-r10 IE in EUTRAN. Specifically, measurement reporting of signals in a cell, such as a SCell in EUTRAN, may be suspended by configuring an infinite measurement cycle for the cell. In a further alternative these instructions may be conveyed through explicit RRC signaling or explicit signaling of respective MAC control elements. This signaling option may, for example, put a particular SCell from legacy deactivated state back to a new deactivated state without measurements.

It may be desirable that that signals in a cell, such as an SCell, after being added/configured in deactivated state, is not measured by the communication device it in deactivated state, but once it has been activated and subsequently deactivated. In other words, the cell is measured also in deactivated state according to a measurement configuration, such as the MeasCycleSCell-r10 in LTE.

In an embodiment a communication device does not perform measurement reporting for a configured cell. Rather, measurement reporting of signals in this cell is only performed when the cell has been activated, that is the communication device has started monitoring a downlink control channel, such as PDCCH or EPDCCH in LTE, carrying scheduling and/or resource allocation information in the cell. However, measurement reporting of signals in this cell may not be suspended or stopped after deactivation of the cell in some embodiments. Measurement reporting related to this cell may be suspended or stopped according to these embodiments by a respective instruction from the network. This instruction may be conveyed through a measurement configuration or through explicit RRC signaling or explicit signaling of respective MAC control elements. Alternatively or additionally, measurement reporting of the cell after deactivation may be suspended or stopped in these embodiments after expiry of a timer. Not suspending/stopping measurement reporting of signals in a cell after deactivation of the cell may be advantageous if the cell is only temporarily deactivated.

In a further embodiment the network may group cells/carriers in such a way that the communication device is aware of co-located cell groups, such as a group of small cells deployed in a co-located manner. The small cells may in particular be controlled by the same access point. Having this information the communication device may only need to measure and/or search for cells on one of the radio carriers while the rest may not be searched. Respective information may be provided from the network by means of an information element in a measurement configuration, such as the MeasObjectEUTRA IE. Specifically, a flag or any other indication may be used to indicate whether or not a configured but deactivated SCell is measured.

In some embodiments the communication device may measure only one cell per carrier and may not need to measure signals on a given carrier that often.

In some embodiments the communication device may measure only one cell per each layer cluster, that is per each frequency layer/band in the same cluster (per component carrier).

In an embodiment the network may configure more than one SCell per carrier (measurement object), where the communication device may measure only one SCell per carrier (measurement object). In addition or alternatively, the communication device may have active one SCell per carrier (measurement object), in case there is a cluster of SCells per measurement object.

In some embodiments a communication device may configured with one or more cells, such as SCell(s) in LTE, wherein the signaling may indicate that the communication device does not need to measure the configured cells. Only when activated, for example by explicit signaling from the network, these cells may become "ordinary" SCells/serving cells that the communication device needs to measure. At the same time the corresponding carrier may start to be considered as intra-frequency by the communication device from measurements and/or measurement requirements point of view.

In some embodiments, the network may configure the communication device with multiple cells, such as SCells in LTE, even on the same carrier. Only one of these cells can be activated at a time. The communication device may then monitor the downlink control channel of the activated cell. It may be desirable for the network to configure a communication device with more cells, such as SCells in LTE, than the maximum number of simultaneous SCells/carriers supported by the communication device. Then the network may activate from the larger set just the necessary cells (at most one per carrier and taking into account possible limitations of the communication device such as supported band combinations). Such a procedure may be based on commands for cell activation/deactivation, such as the respective MAC control elements in LTE. Existing commands for activation/deactivation, such as said MAC control elements, may be enhanced or a new signaling mechanism may be used to allow indicating activation status of more cells to a communication device than can be simultaneously supported by the communication device. The enhanced or new signaling may use additional bits to account for more cells, or some grouping mechanism may be used to reduce the signaling effort.

For example, in LTE a suitable MAC control element may consist of, for example, 31 bits used for SCells and additional bits, for example 2-3 bits, to select a certain SCell group. The additional, for example 2-3 bits, may indicate to which group of SCells the rest of the bits maps to. The groups may correspond to different locations of SCells. For example, SCells in group 1 may be roughly in the same location but on different frequencies, and SCells in group 2 may be roughly in the same location but on different frequencies. In this case the communication cannot simultaneously be configured with SCells from group 1 and 2 on the same carrier (in LTE CA, a communication device cannot have two serving cells on the same carrier), and the communication device should typically not be configured with SCells from group 1 and 2 on different carriers either (rather, having both cells in group 1 or group 2 is preferred, as the cells within the group are roughly overlapping). This grouping can apply to all SCells or only some of them.

In an embodiment the network may configure more than one SCell per carrier (measurement object), where a communication device may measure just one SCell per carrier (measurement object). In addition or alternatively, communication device would have active one SCell per carrier (measurement object), in case there is a cluster of SCells per measurement object. These embodiments may in particular be used in LTE-LAA and may support partially autonomous SCell management.

In some embodiments, multiple cells may be configured for a communication device at once (where some of them are likely going to be actively used (activated) while also some are not going to be used/activated). Such configuration of multiple cell may be used to obtain substantial savings with regard to the signaling effort compared to a individual configuration of cells.

In an embodiment common cell configuration information may be provided by the network in a first step for configuring a group of cells in a network. Subsequently, the network may provide more specific cell configuration information for subgroups, and in particular cell-individual cell configuration information. The more specific or individual information may in particular override some elements of the previously provided common cell configuration. The respective groups or subgroups of cells may be identified by predetermined group identifiers or a list of individual identifiers.

A similar approach can be applied for Inter-frequency and Inter-RAT measurements and configuration.

Figure 5:
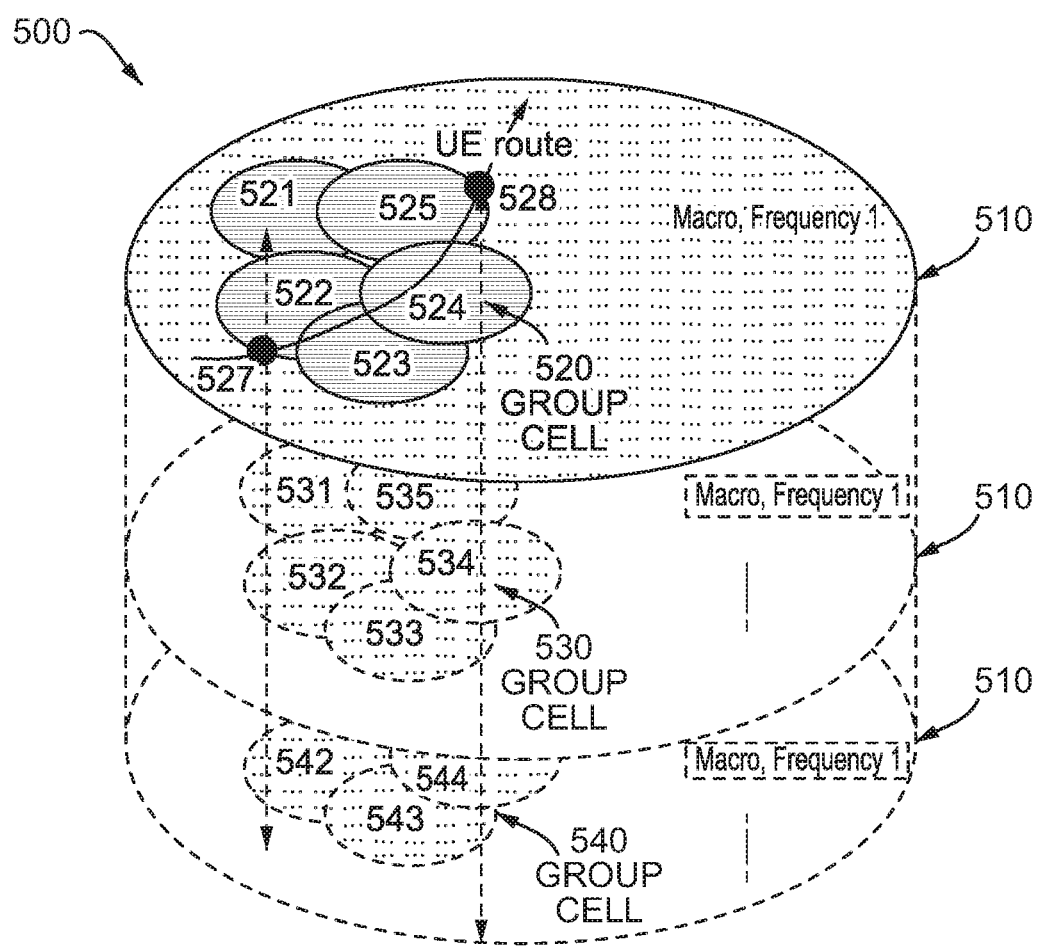
FIG. 5 shows an illustrative deployment scenario of a heterogeneous network.

FIG. 5 shows an illustrative deployment scenario of a heterogeneous network. The network area comprises a macro cell in a frequency range 1 with coverage area 510 and three groups 520, 530 and 540 of small cells at a hot spot in the coverage area 510 of the macro cell. The first group of small cells 520 may be operated in the frequency range 1 of the macro cell. The second group of small cells 530 may be operated in a frequency range 2. The third group of small cells 540 may be operated in a frequency range 3. A communication device passes through the area of the hot spot along a route between points 527 and 528. The frequency ranges may reflect regulatory specifications, for example whether it is in licensed or unlicensed spectrum, and/or limitations of the radio part according to capability information of the communication device or a class of communication devices and/or any similar aspect an operator may have to consider in its strategy for radio resource management.

At point 527 the communication device may receive configuration information for SCells 522, 532 and 542. The communication device configures SCells 522, 532 and 542 according to this information. The communication device may further receive information that SCells 522, 532 and 542 are co-located. The co-location information implies that measurement results of signals in these cells may be strongly correlated. SCells 522, 532 and 542 may therefore be arranged in one measurement reporting group. SCell 522 may be configured as reference cell in this group, for example for power saving reasons in the radio part because SCell 522 is operated in the frequency band of the macro cell/primary cell. The communication device starts measurement reporting based on this measurement group arrangement only for reference cell 522, and the network will use the measurement reports for radio resource management of all SCells in the group.

In case the communication device is moving at high velocity, an additional measurement report group comprising SCells 523, 533 and 543 may be arranged, so as to prepare cell activation along the further route of the communication device.

The invention has been explained and illustrated mainly with reference to carrier aggregation in an evolved universal terrestrial radio access network (EUTRAN). It should be understood that embodiments of the invention can be used in other radio access technologies or deployments without or with only minor modifications or adaptations. As discusses above, dual connectivity in LTE reuses with regard to the air interface concepts known from carrier aggregation in LTE. In a system employing dual connectivity cells configured for a communication device may be provided from different access node. The skilled person may appreciate that the interaction between two access nodes may change the radio resource management in a network area, but has no effect on the applicability of the presented reporting scheme. Embodiments of the invention can therefore be used in LTE networks employing dual connectivity.

It should be understood that each block of the flowchart of the Figures and any combination thereof may be implemented by various means or their combinations, such as hardware, software, firmware, one or more processors and/or circuitry.

Figure 6:
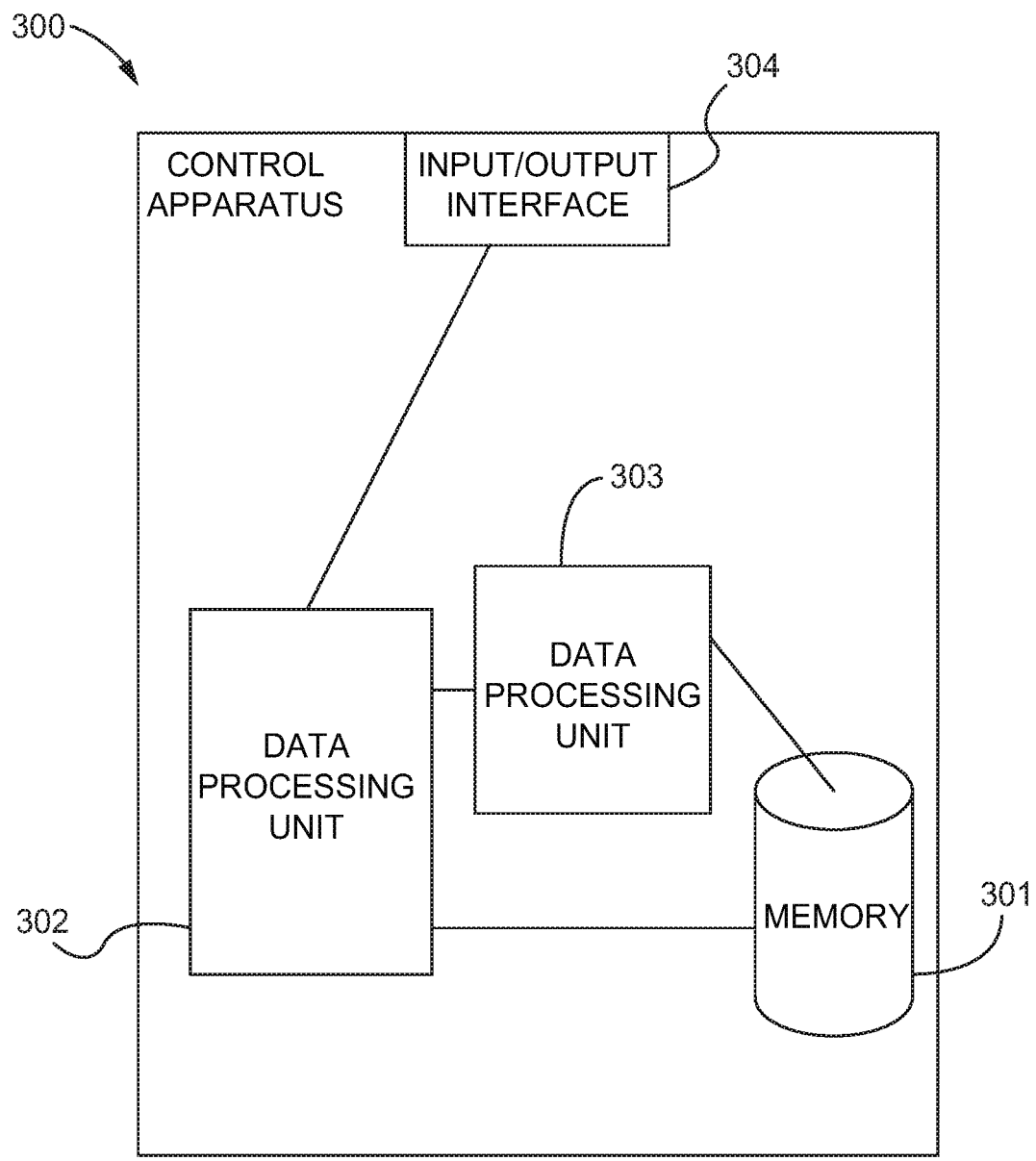
FIG. 6 shows a schematic diagram of an example control apparatus.

The method may be implemented on a mobile device as described with respect to FIG. 2 or control apparatus as shown in FIG. 6. FIG. 6 shows an example of a control apparatus for a communication system, for example to be coupled to and/or for controlling a station of an access system, such as a RAN node, e.g. a base station, (e) node B or 5G AP, a central unit of a cloud architecture or a node of a core network such as an MME or S-GW, a scheduling entity, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control functions may comprise providing environment information indicative of overlaps between coverage areas of configured cells in a network area. Control functions may further comprise configuring measurement reporting group comprising a reference cell and associated cells in a set of configured cells It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE networks, similar principles may be applied in relation to other networks and communication systems, for example, 5G networks. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising:
  at least one processor; and
  at least one memory including computer program code, the at least one memory and the computer program code configured, with the at least one processor, to cause the apparatus to perform at least the following:
  receive in a cellular mobile network, configuration information related to cells in an area of a network comprising first configuration information for a first cell and one or more second cells, wherein the first configuration information comprises an indication of a downlink radio carrier frequency of the first cell and downlink radio carrier frequencies of each of the one or more second cells;
  receive environment information indicative of overlaps between coverage areas of the first cell and the one or more second cells, wherein the environment information is indicative of location information of one or more transmission points of the first cell, and location information of one or more transmission points of each of the one or more second cells;
  configure a measurement reporting group comprising the first cell and one or more second cells, wherein an arrangement of the reporting group is dependent upon whether the apparatus is moving, data traffic requirements of the apparatus, characteristics of a radio part of the apparatus, and whether a frequency band is on a licensed or an unlicensed spectrum; and
  cause transmission of measurement results obtained in the first cell for use in radio resource management of the apparatus in the one or more second cells;
  wherein the downlink radio carrier frequency of the first cell and the downlink radio carrier frequencies of each of the one or more second cells are in a frequency band of a predetermined bandwidth.

2. The apparatus according to claim 1, wherein the configuration of the first cell and the one or more second cells requires presence of a third cell for providing the apparatus with at least one of:
  non-access stratum mobility information, or
  security input at radio resource control connection establishment or resource control connection reestablishment or handover.

3. The apparatus according to claim 1, wherein the location information for at least one transmission point of the first cell is identical with the location information of at least one of the transmission points of each of the one or more second cells.

4. The apparatus according to claim 1, wherein the environment information indicative of overlaps between coverage areas of the first cell and the one or more second cells comprises an indication of association between the first cell and the one or more second cells.

5. The apparatus according to claim 4, wherein the indication of association comprises information on an arrangement of the first cell and the one or more second cells in a measurement reporting group.

6. The apparatus according to claim 5, wherein the information on the arrangement comprises selection information for use of the first cell as a reference cell in the measurement reporting group, wherein measurement reporting is only performed for the reference cell in the measurement reporting group.

7. The apparatus according to claim 1, wherein the coverage areas of the first cell and the one or more second cells are of about the same size and the coverage area of the first cell overlaps with the coverage areas of each of the one or more second cells.

8. The apparatus of claim 1, wherein the at least one memory and the computer program code are configured, with the at least one processor, to further cause the apparatus to communicate in a fourth cell,
wherein the downlink radio carrier frequency of the fourth cell is in a frequency range which allows for measurement of signals in the first cell without causing measurement gaps in the communication between the apparatus and an access node of the fourth cell.

9. The apparatus according to claim 8, wherein the fourth cell is identical with a third cell.

10. The apparatus according to claim 1, wherein the first cell is activated for the apparatus for monitoring a downlink control channel carrying scheduling or resource allocation information in the first cell, and the one or more second cells are not activated for the apparatus for monitoring a downlink control channel carrying scheduling or resource allocation information in any of the one or more second cells.

11. The apparatus according to claim 1, wherein the at least one memory and the computer program code are configured, with the at least one processor, to cause the apparatus to further perform at least the following:
activate or deactivate one of the one or more second cells for the apparatus for monitoring a downlink control channel carrying scheduling or resource allocation information in the one of the one or more second cells; and
cause transmission of measurement results obtained in the one of the one or more second cells for use in radio resource management of the apparatus in the one of the one or more second cells.

12. The apparatus according to claim 11, wherein the at least one memory and the computer program code are further configured, with the at least one processor, to cause the apparatus to perform at least the following:
receive a measurement control message related to measurements of the one of the one or more second cells comprising a suspend indication; and
suspend transmission of measurement results obtained in the one of the one or more second cells for use in radio resource management of the apparatus in the one of the one or more second cells based on the suspend indication.

13. The apparatus according to claim 1, wherein the at least one memory and the computer program code are further configured, with the at least one processor, to cause the apparatus to perform at least the following:
cause transmission of validity information indicative of a degree of validity of the received environment information indicative of overlaps between coverage areas of the first cell and the one or more second cells.

14. The apparatus according to claim 1, wherein a downlink control channel is a physical downlink control channel or an enhanced physical downlink control channel in an evolved universal terrestrial radio access network.

15. An apparatus, comprising:
at least one processor; and
at least one memory including computer program code, the at least one memory and the computer program code configured, with the at least one processor, to cause the apparatus to perform at least the following:
cause transmission of configuration information related to cells in an area of a cellular mobile network comprising first configuration information for a first cell and one or more second cells, wherein the first configuration information comprises an indication of a downlink radio carrier frequency of the first cell and downlink radio carrier frequencies of each of the one or more second cells;
cause transmission of environment information indicative of overlaps between coverage areas of the first cell and the one or more second cells, wherein the environment information is indicative of location information of one or more transmission points of the first cell, and location information of one or more transmission points of each of the one or more second cells;
configure a measurement reporting group comprising first and one or more second cells, wherein an arrangement of the reporting group is dependent upon whether the apparatus is moving, data traffic requirements of the apparatus, characteristics of a radio part of the apparatus, and whether a frequency band is on a licensed or an unlicensed spectrum;
receive measurement results obtained in the first cell; and
use the measurement results in radio resource management of a communication device in the one or more second cells;
wherein the downlink radio carrier frequency of the first cell and the downlink radio carrier frequencies of each of the one or more second cells are in a frequency band of a predetermined bandwidth.

16. The apparatus according to claim 15, wherein configuration of the first cell and the one or more second cells requires the presence of a third cell for providing the communication device with at least one of:
non-access stratum mobility information, or
security input at radio resource control connection establishment or resource control connection reestablishment or handover.

17. A method, comprising:
receiving at an apparatus in a cellular mobile network configuration information related to cells in an area of a network comprising first configuration information for a first cell and one or more second cells, wherein the first configuration information comprises an indication of a downlink radio carrier frequency of the first cell and downlink radio carrier frequencies of each of the one or more second cells;
receiving, at the apparatus, environment information indicative of overlaps between coverage areas of the first cell and the one or more second cells, wherein the environment information is indicative of location information of one or more transmission points of the first cell, and location information of one or more transmission points of each of the one or more second cells;

configuring by the apparatus, a measurement reporting group comprising the first cell and one or more second cells, wherein an arrangement of the reporting group is dependent upon whether the apparatus is moving, data traffic requirements of the apparatus, characteristics of a radio part of the apparatus, and whether a frequency is on a licensed or an unlicensed spectrum; and causing, by the communication device, transmission of measurement results obtained in the first cell for use in radio resource management of the communication device in the one or more second cells;

wherein the downlink radio carrier frequency of the first cell and the downlink radio carrier frequencies of each of the one or more second cells are in a frequency band of a predetermined bandwidth.

* * * * *